US008811190B2

(12) United States Patent
Gray et al.

(10) Patent No.: US 8,811,190 B2
(45) Date of Patent: Aug. 19, 2014

(54) MAXIMUM TRANSMISSION UNIT (MTU) SIZE DISCOVERY MECHANISM AND METHOD FOR DATA-LINK LAYERS

(75) Inventors: Eric Gray, Pitman, NJ (US); Bob Frazier, Raleigh, NC (US); Panagiotis Saltsidis, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 205 days.

(21) Appl. No.: 13/202,802

(22) PCT Filed: Feb. 22, 2010

(86) PCT No.: PCT/IB2010/000340
§ 371 (c)(1),
(2), (4) Date: Aug. 23, 2011

(87) PCT Pub. No.: WO2010/095028
PCT Pub. Date: Aug. 26, 2010

(65) Prior Publication Data
US 2011/0305143 A1  Dec. 15, 2011

Related U.S. Application Data

(60) Provisional application No. 61/154,535, filed on Feb. 23, 2009.

(51) Int. Cl.
*H04L 12/26* (2006.01)
(52) U.S. Cl.
USPC ............................................................ 370/242
(58) Field of Classification Search
USPC ................................................. 370/252, 400
See application file for complete search history.

(56) References Cited

U.S. PATENT DOCUMENTS

| 5,261,044 | A | * | 11/1993 | Dev et al. | 715/855 |
|---|---|---|---|---|---|
| 5,727,157 | A | * | 3/1998 | Orr et al. | 709/224 |
| 6,374,303 | B1 | * | 4/2002 | Armitage et al. | 709/242 |
| 7,697,556 | B2 | * | 4/2010 | Gray | 370/419 |
| 7,848,259 | B2 | * | 12/2010 | Gray et al. | 370/255 |
| 8,010,643 | B2 | * | 8/2011 | Gray et al. | 709/223 |
| 8,130,661 | B2 | * | 3/2012 | Kannan et al. | 370/252 |
| 2005/0091482 | A1 | * | 4/2005 | Gray et al. | 713/151 |
| 2005/0094567 | A1 | * | 5/2005 | Kannan et al. | 370/241 |
| 2005/0108379 | A1 | * | 5/2005 | Gray et al. | 709/223 |
| 2006/0227781 | A1 | * | 10/2006 | Marce et al. | 370/392 |
| 2008/0101386 | A1 | * | 5/2008 | Gray | 370/401 |
| 2008/0172493 | A1 | * | 7/2008 | Gray et al. | 709/230 |
| 2008/0189353 | A1 | * | 8/2008 | Gray et al. | 709/202 |
| 2008/0298258 | A1 | * | 12/2008 | Susilo et al. | 370/248 |
| 2009/0003241 | A1 | * | 1/2009 | Teng | 370/254 |
| 2009/0080345 | A1 | * | 3/2009 | Gray | 370/255 |
| 2010/0265967 | A1 | * | 10/2010 | Lim et al. | 370/474 |
| 2010/0284418 | A1 | * | 11/2010 | Gray et al. | 370/401 |

OTHER PUBLICATIONS

IEEE Std 802.1Q-2005, IEEE Computer Society.*
IEEE Std 802.1ag-2007, IEEE Computer Society.*
IEEE Std 802.1AB-2006, IEEE Computer Society.*

(Continued)

*Primary Examiner* — Mark Rinehart
*Assistant Examiner* — Peter Solinsky

(57) ABSTRACT

An L2 Ethernet end-station and MTU size discovery method are described herein that are capable of discovering a Maximum Transmission Unit (MTU) size for each Data Link Layer (DLL) connection to other similarly capable L2 Ethernet end-stations.

13 Claims, 3 Drawing Sheets

(56) References Cited

OTHER PUBLICATIONS

Karel Slavicek ED—Yevgeni Koucheryavy et al: "Maximum Frame Size in Large Layer 2 Networks" Sep. 10, 2007, Next Generation Teletraffic and Wired/Wireless Advanced Networking; [Lecture Notes in Computer Science], Springer Berlin Heidelberg, Berlin, Heidelberg, XP019070771, ISBN: 978-3-540-74832-8.

Anonymous: "IEEE Standard for Local and metropolitan area networks Station and Media Access Control Connectivity Discovery; IEEE Std 802.1AB-2005 ED " IEEE Standard; [IEEE Standard], IEEE, Piscataway, NJ, USA, May 6, 2005, XP017601985, ISBN: 978-0-7381-4687-4.

Parker J et al: "Recommendations for Interoperable Networks using Intermediate System to Intermediate System (IS-IS); rfc3719.txt" IETF Standard, Internet Engineering Task Force, IETF, CH, Feb. 1, 2004, XP015009499.

* cited by examiner

MAXIMUM TRANSMISSION UNIT (MTU) SIZE DISCOVERY MECHANISM AND METHOD FOR DATA-LINK LAYERS

This application claims the benefit of U.S. Provisional Application No. 61/154,535, filed Feb. 23, 2009, the disclosure of which is fully incorporated herein by reference.

TECHNICAL FIELD

The present invention relates in general to the field of L2 Ethernet networking and, in particular, to an end-station and method that are capable of discovering a Maximum Transmission Unit (MTU) size for each Data Link Layer (DLL) connection to other similarly capable end-stations.

BACKGROUND

The following abbreviations are herewith defined, at least some of which are referred to within the following description of the prior art and the present invention.
ARP Address Resolution Protocol
CFM Connectivity Fault Management
DLL Data Link Layer
DSCP Differentiated Services Code Point
IEEE Institute of Electrical and Electronic Engineers
IETF Internet Engineering Task Force
IP Internet Protocol (versions 4 or 6)
IS-IS Intermediate System to Intermediate System (routing protocol)
L1L2 Layer 1, Layer 2 (boundary)
L2 Layer 2
L3 Layer 3
LAN Local Area Network
LBM Loop Back Message
LLDP Link Layer Discovery Protocol
LLDP-MED LLDP—Media Endpoint Discovery
MTU Maximum Transmission Unit
OSI Open Systems Interconnect
PDU Protocol Data Unit
TLV Type Length Value
TRILL Transparent Routing over Lots of Links
VLAN Virtual Local Area Network The discussion herein relates to Ethernet networking and in particular to shortest path bridging using IS-IS link-state routing or any other Data-Link Layer technology where devices need to be aware of the actual or real MTU size. Two proposals currently exist for performing shortest path bridging: (1) the ongoing work in the Internet Engineering Task Force (IETF) Transparent Routing over Lots of Links (TRILL) working group; and (2) the ongoing work in the IEEE 802.1 Interworking working group that works with IEEE 802.1Qaq-d1-5 entitled "Virtual Bridged Local Area Networks—Amendment 9: Shortest Path Bridging" (the contents of which are incorporated by reference herein).

The TRILL and IEEE proposals each use IS-IS routing which is natively designed for a variety of Network Layer (L3) transmission and forwarding technologies (commonly referred to as L3 routing), including IP, an OSI address based routing. In such L3 technologies, there is no problem if routing peers fail to discover links that do not support the same MTU size as is defined for each routing peer. However, in L2 technologies the use of IS-IS for shortest path determination and forwarding is an example where it is critical that the routing peers know the real MTU size for a network path. In particular, in L2 technologies which use shortest path bridging with IS-IS link-state routing, it is critical that the IS-IS peers know the real MTU size so they can discover each other as otherwise it will be possible to establish persistent loops in the layer 2 forwarding topology.

This problem can occur when two adjacent IS-IS peers do not discover each other using the IS-IS hello protocol because the discovery PDUs are too large and as such each peer will decide that they are the designated forwarder for the local link. Thus, each peer will be unable to distinguish PDUs forwarded by the other peers from the PDUs sent by other end-stations in the network, and those peers will blindly forward them. In this situation, the network ends-up with invisible re-forwarders, causing the PDUs to be repeatedly forwarded by each peer. This is actually the likely outcome, given the way that IS-IS (and several other similar protocols) tend to stuff (often by padding) the PDUs and in particular the discovery PDUs.

To prevent the creation of L2 persistent loops, an IS-IS peer shortest path bridging instance needs to know a priori what the real MTU size is for its connection to an adjacent IS-IS shortest path bridge. This will prevent the over-stuffing of the PDUs to a size in excess of the real MTU size for the path connecting key end-stations. Thus, where broadcast/multicast PDUs are used in broadcast-based L2 technologies, the MTU used would need to be determined as the least MTU size for all paths. However, in certain applications where an L2 participating device is an Ethernet (or other DLL) end-station, it is useful to know the MTU between the two end-stations independent of the MTU values that may apply in links not included in the L2 forwarding path between those two end-stations. This allows for unicast PDUs to be forwarded at the largest real MTU size for the path connecting the two end-stations.

Thus, while it is possible to simply configure an MTU for an entire L2 network that is equal to the least MTU of any link in the network, this approach may result in a lower value of MTU than is actually required for most end-station pairs. Although there are approaches that can be used in IP networks to determine the real MTU between pairs of end-stations these approaches cannot be applied to L2 networks since there is not an error reporting mechanism in L2 networks that includes the capability to report to a sender that a PCU was dropped as "big." Accordingly, there is a need to address this problem by enabling end-station pairs to determine the real MTU for their DLL connection. This need and other needs have been satisfied by the present invention.

SUMMARY

In one aspect, the present invention provides a method implemented by a MTU discovery capable end-station in a L2 Ethernet network with multiple end-stations and at least a portion of the end-stations are MTU discovery capable end-stations. The method includes the steps of: (1) obtaining L2 addresses of the multiple end-stations; (2) discovering the other MTU discovery capable end-stations; (3) and discovering a MTU size for a DLL connection to each of the other MTU discovery capable end-stations, where the MTU discovery capable end-stations are able to perform the obtaining step and the two discovering steps while the end-stations are able to perform the obtaining step. The MTU discovery capable end-station can advantageously use the discovered MTU size to forward unicast PDUs at the largest real MTU size for the path connecting to another MTU discovery capable end-station rather than having to forward the unicast PDUs to the other MTU discovery capable end-station at the least MTU size for all of the paths in the Ethernet network.

In yet another aspect, the present invention provides a MTU discovery capable end-station in a L2 Ethernet network with multiple end-stations and at least a portion of the end-stations are MTU discovery capable end-stations. The MTU discovery capable end-station includes: (1) a processor; and (2) a memory that stores processor-executable instructions where the processor interfaces with the memory and executes the processor-executable instructions to perform the following operations: (1) obtaining L2 addresses of the multiple end-stations; (2) discovering the other MTU discovery capable end-stations; and (3) discovering a MTU size for a DLL connection to each of the other MTU discovery capable end-stations, where the MTU discovery capable end-stations are able to perform the obtaining operation and the two discovering operations while the end-stations are able to perform the obtaining operation. The MTU discovery capable end-station can advantageously use the discovered MTU size to forward unicast PDUs at the largest real MTU size for the path connecting to another MTU discovery capable end-station rather than having to forward the unicast PDUs to the other MTU discovery capable end-station at the least MTU size for all of the paths in the Ethernet network.

In still yet another aspect, the present invention provides a L2 Ethernet network which has multiple end-stations at least a portion of which are MTU discovery capable end-stations, where each MTU discovery capable end-station includes: (1) a processor; and (2) a memory that stores processor-executable instructions where the processor interfaces with the memory and executes the processor-executable instructions to perform the following operations: (1) obtaining L2 addresses of the multiple end-stations; (2) discovering the other MTU discovery capable end-stations; and (3) discovering a MTU size for a DLL connection to each of the other MTU discovery capable end-stations, where the MTU discovery capable end-stations are able to perform the obtaining operation and the two discovering operations while the end-stations are able to perform the obtaining operation. The MTU discovery capable end-station can advantageously use the discovered MTU size to forward unicast PDUs at the largest real MTU size for the path connecting to another MTU discovery capable end-station rather than having to forward the unicast PDUs to the other MTU discovery capable end-station at the least MTU size for all of the paths in the Ethernet network.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

In the following description, a brief discussion about the MTU discovery capable end-station and MTU size discovery method of the present invention is provided first and then a detailed discussion is provided to describe details and enable a thorough understanding about several different embodiments of the present invention that can be used in a L2 Ethernet Network so a MTU discovery capable end-station can discover the MTU size for each DLL connection to other MTU discovery capable end-stations. It will be apparent to one of ordinary skill in the art having had the benefit of the present disclosure that the present invention may be practiced in other embodiments that depart from the specific details disclosed herein. Moreover, it will be apparent to one of ordinary skill in the art that descriptions of well-known architectures, devices, interfaces and signaling steps have been omitted so as not to obscure the description of the present invention.

Figure 1:
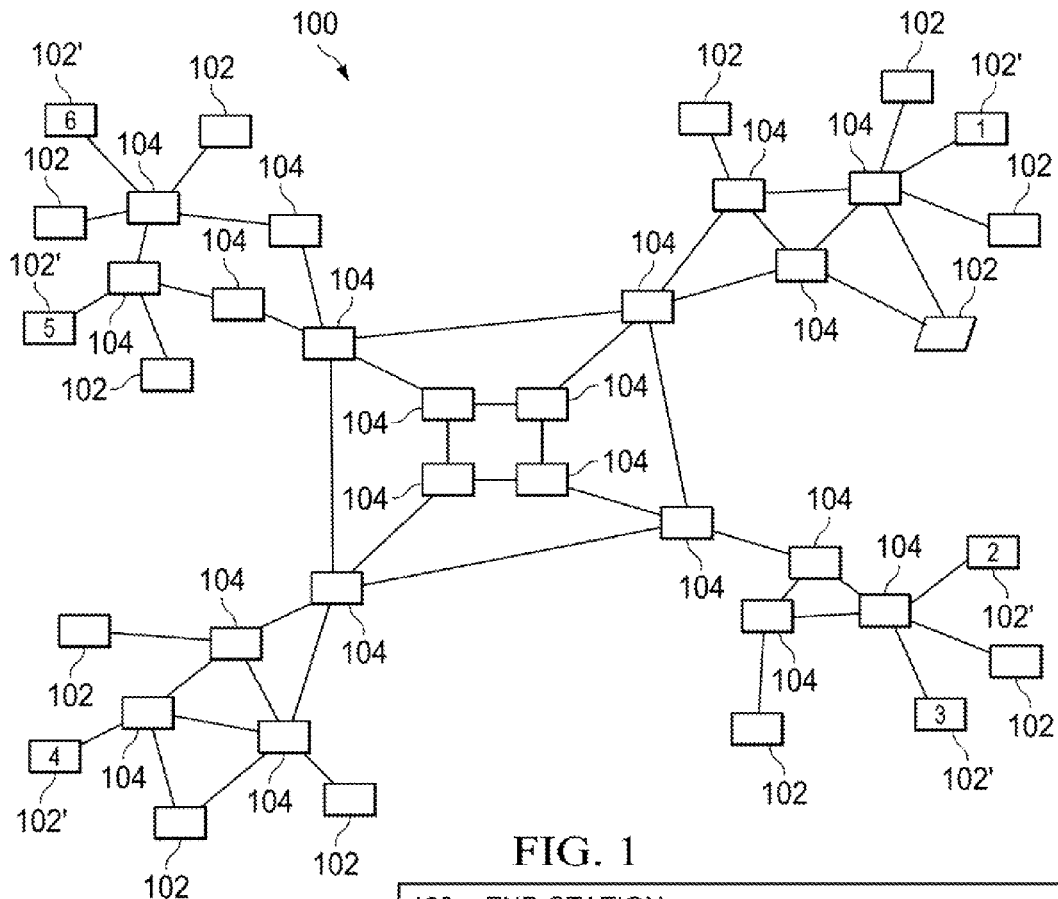
FIG. 1 is a block diagram of an exemplary Ethernet network which includes end-stations and intermediate routers where at least a portion of the end-stations are MTU discovery capable end-stations which are configured in accordance with an embodiment of the present invention.
Figure 2:
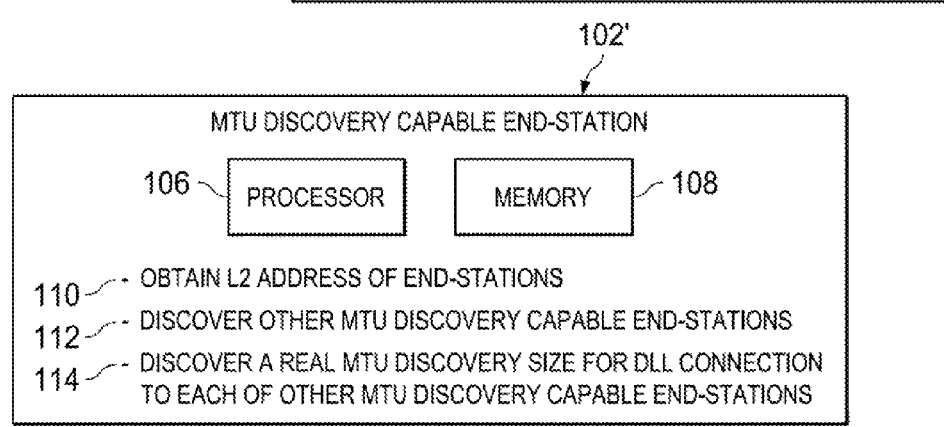
FIG. 2 is a block diagram illustrating the basic components and functionality of the MTU discovery capable end-station in accordance with an embodiment of the present invention.

Referring to FIG. 1, there is a diagram of an exemplary L2 Ethernet network 100 which has multiple end-stations 102 that are connected to one another via multiple intermediate routers 104 where at least some of the end-stations 102 are MTU discovery capable end-stations 102' which are configured in accordance with an embodiment of the present invention. As shown in FIG. 2, each MTU discovery capable end-station 102' includes one or more processors 106 and at least one memory 108 (storage 108) that has processor-executable instructions where the processor(s) 106 are adapted to interface with the at least one memory 108 and execute the processor-executable instructions to: (1) obtain L2 addresses of the other end-stations 102 within the L2 Ethernet network 100 (step 110); (2) discover the other MTU discovery capable end-stations 102' (step 112); and (3) discover a MTU size for a DLL connection to each of the other MTU discovery capable end-stations 102' (step 114) (note: the one or more processors 106 and the at least one memory 108 can be implemented, at least partially, as software, firmware, hardware, or hard-coded logic). A detailed discussion is provided next about several different exemplary ways that the MTU-capable end-stations 102' can be configured and implement steps 110, 112 and 114 to discover the MTU size for the DLL connection to each of the other MTU discovery capable end-stations 102'.

In the first step 110, each MTU discovery capable end-station 102' can obtain the L2 addresses of the end-stations 102 within the L2 Ethernet network 100 in anyone of a number of ways. For instance, each MTU discovery capable end-station 102' can send initial explorer frames via a broadcast message mechanism to discover all reachable end-stations 102 in the L2 Ethernet network 100. This assumes that all L2 addresses of the supposedly reachable end-stations 102 are not already known a priori because if they are then this step may be omitted. One way that L2 address information may be known a priori is via configuration or dynamically if the end-stations 102 support the Link Layer Discovery Protocol (LLDP). The LLDP is described in IEEE802.1AB—2005 entitled "IEEE Standard for Local and Metropolitan Area Networks-Station and Media Access Control Connectivity Discovery" (the contents of which are incorporated by reference herein). Another way that L2 address information may be known a priori is on the basis of higher-layer requirements. For example, the L2 addresses of each end-station 102 may be derived from a higher layer address using either some analog of the address resolution protocol (ARP), or some algorithm that is based for example on the inclusion of the L2 addresses of the end-stations 102 in the higher layer addresses, as might be the case when using OSI addresses and IS-IS.

In the second step 112, each MTU discovery capable end-station 102' can discover the other MTU discovery capable end-stations 102' in anyone of a number of ways. For instance, this step can be accomplished by having each MTU discovery capable end-station 102' send a broadcast based explorer message that will only be understood by similar MTU discovery capable end stations 102'. In this case, each MTU discovery capable end station 102' responds to the sender of every explorer message it receives, and records the sender's L2 address, thus learning that L2 address and providing that sender with its own L2 address. Other exemplary ways that the MTU discovery capable end-stations 102' can discover other MTU discovery capable end-stations 102' including knowing them a priori are discussed later below.

In the third step 114, each MTU discovery capable end-station 102' can discover the MTU size for a DLL connection to each of the other MTU discovery capable end-stations 102' in anyone of a number of ways. For instance, this step can be accomplished by having each MTU discovery capable end-station 102' use: (1) an explorer protocol (between cooperating, similarly designed systems); or (2) a Connectivity Fault Management (CFM) loopback mechanism with basic functions as defined in clause 25.5.6 of IEEE 802.1Q, 2008 Edition DRAFT D0.3 entitled "Draft IEEE Standard for Local and Metropolitan Area Networks-Virtual Bridged Local Area Networks" (the contents of which are incorporated by reference herein). In the first case, once the set of L2 addresses for the reachable (and cooperating) MTU discovery capable end-stations 102' is known, then the each MTU discovery capable end-station 102' would conduct a pair-wise process of determining the effective (or real) MTU size for the DLL connection connecting it to each of the other MTU discovery capable end-stations 102'. Each MTU discovery capable end-station 102' can do this by using a well defined mechanism such as a proprietary messaging explorer protocol that utilizes varying sizes of messages to probe MTU discovery capable end-stations 102' to determine the actual MTU sizes. In the second case, once the set of L2 addresses for the reachable (and cooperating) MTU discovery capable end-stations 102' addresses is known, then each MTU discovery capable end-station 102' would use CFM loopback messages of varying sizes to to probe MTU discovery capable end-stations 102' to determine the actual MTU sizes. In both case, any reasonable scheme might be used to determine the successive frame sizes used in probing for MTU size. For example, the sending MTU discovery capable end-station 102' may first send a PDU of a size corresponding to the maximum transmission size of their port/interface hardware and on failing to receive the appropriate response from another MTU discovery capable end-station 102' then it would try successively smaller PDU sizes until successful reception of an appropriate response occurs. Using these techniques (or similar techniques), it is possible to determine the MTU size for a DLL connection between any two MTU discovery capable end stations 102'.

Referring again to FIG. 1 the exemplary Ethernet network 100 shown has multiple end-stations 102 some of which are MTU discovery capable end-stations 102' that have been numbered 1-6 in the clock-wise direction for reference purposes only. In the discussion below, it is assumed for this scenario that the following two cases apply:

Each MTU discovery capable end-station 102' knows the L2 address information for all of the other end-stations 102 (including by default the other MTU discovery capable end-stations 102') through some mechanism as has been described previously above.

Some subset of these MTU discovery capable end-stations 102' is unaware of the full set of L2 addresses for all of the other MTU discovery capable end-stations 102'.

Thus, in this example the first step is to have each MTU discovery capable end-station 102' determine the full set of L2 addresses for the other MTU discovery capable end-stations 102'. For instance, this can be accomplished by having each MTU discovery capable end-station 102' send a broadcast based explorer message that will only be understood by similar MTU discovery capable end-stations 102'. As such, each MTU discovery capable end station 102' responds to the sender of every explorer message it receives, and records the sender's L2 address, thus learning the sender's L2 address and providing that sender with its own L2 address.

In this case, the sending MTU discovery capable end-stations 102' would each send an initial explorer message having a size that is the minimum useful PDU size for the DLL technology, thus ensuring that PDUs used for this purpose are delivered if it is possible to do so. The sending MTU discovery capable end-stations 102' may periodically repeat the sending of the explorer messages to allow for the possibility of lost messages and to support the addition of new MTU discovery capable end-stations 102'. If consistent with this minimum size requirement, the explorer PDU may also contain information useful in optimizing the subsequent MTU size discovery process. For instance, the explorer PDU and response PDU may contain information indicating the local maximum PDU sizes at the two MTU discovery capable end-stations 102' allowing for an initial starting MTU discovery PDU having a size equal to the lesser maximum of the two MTU discovery capable end-stations 102' which will be involved in the MTU size discovery process. In any case, as the sending MTU discovery capable end-station 102' receives responses to its explorer messages, it either creates a list of the MTU discovery capable end-stations 102' with which it subsequently will perform the MTU size discovery process or it begins immediately to perform the MTU size discovery process on an L2 address by L2 address basis.

An optional addition to the explorer protocol could be the link-level discovery protocol (LLDP)(see IEEE 802.1AB). This is a one way protocol which advertises the information about the link-layer. One of the mandatory TLVs in an LLDP message is a Chassis ID TLV and within this Chassis ID TLV the MAC address (L2 address) of the remote MTU discovery capable end-station 102' can be included. Furthermore, LLDP-MED, LLDP extended for media endpoint detection may be used to advertise additional network policies such as VLAN configuration and attributes, layer 2 priority and a DSCP value. Alternatively, L2 addresses may simply be learned by listening for sending MTU discovery capable end-stations 102' with an unknown L2 address.

Whether the L2 addresses of all the MTU discovery capable end-stations 102' are known a priori or need to be discovered, once the L2 addresses are known for the MTU discovery capable end-stations 102', then the process of MTU size discovery begins. In this example, each of the 6 MTU discovery capable end-stations 102' has an initial value that it will start with in discovering the pair-wise MTU size that applies to each of the other 5 MTU discovery capable end-stations 102'. The initial value may be configured or may have been determined from the port/interface (using—for example—a device interface function call such as ioctl) connected to the link of the respective MTU discovery capable end-station 102'. Initially, it is assumed in this example that each of MTU discovery capable end-stations 102' does not have information about the effective MTU size that applies to the set of links that connect it to each of the other 5 MTU discovery capable end-stations 102'.

As discussed above, each MTU discovery capable end-station 102' can discover the MTU size for a DLL connection to each of the other MTU discovery capable end-stations 102' in anyone of a number of ways. In one case, each MTU discovery capable end-station 102' could use a well defined mechanism such as a proprietary messaging explorer protocol that uses varying sizes of messages to probe MTU discovery capable end-stations 102' to determine the actual MTU size to each of the other MTU discovery capable end-stations 102'. In another case, each MTU discovery capable end-station 102' could use CFM loopback messages of varying sizes to determine the actual MTU size to each of the other MTU discovery capable end-stations 102'. In both cases, any reasonable scheme might be used to determine the successive frame sizes used in probing for MTU size. For example, the sending MTU discovery capable end-station 102' may first send a PDU of a size corresponding to the maximum transmission size of their port/interface hardware and on failing to receive the appropriate response from another MTU-capable end-station 102' then keep sending successively smaller PDU messages until a successful reception of an appropriate response occurs.

The MTU size discovery process may be subject to several controls. For example, these controls may include the following:
  A minimum period of time during which no subsequent probe PDU messages are sent if a previous message did not result in a successful response (retry timer).
  A re-try number used to determine how many probe PDU message are sent before a different size probe PDU message is tried.
  A value used as the increment by which subsequent probe PDU messages differ in length from prior probe PDU messages.
  A list of candidate probe PDU message sizes.
  A specific sizing algorithm selector.

The MTU size discovery process is repeated by each MTU discovery capable end-station 102' for all MTU discovery capable end-stations 102'. In this example, each MTU discovery capable end-station 1-6 would repeat this process with all of the other MTU discovery capable end-stations (1 for 2-6, 2 for 1 and 3-6, etc.). This MTU size discovery process can be used by each MTU discovery capable end-station 102' to determine the per-pair MTU size at the data-link layer that applies for communicating with the remote MTU discovery capable end-stations 102'. Each MTU discovery capable end-station 102' that employs this approach could maintain per end-station destination MTU size values. The MTU size discovery process might be periodically repeated to ensure that any change in effective MTU size is detected. Or, the MTU size discovery process may be triggered as a result of detection of a L2 topology change in the network 100.

In an alternative, the MTU size discovery process does not necessarily require both end-stations 102 to be MTU discovery capable. This could be the case if the end-stations 102 had some specific L2 technology that supported some form of loopback mechanism that can be exploited for MTU discovery. In this situation, the MTU size discovery process may be performed by any MTU discovery capable end-station 102' for all end-stations 102 whether they are known to be MTU discovery capable or not. In the simplest case, each end-station 102 supports CFM as defined in IEEE 802.1Q. Then, the MTU discovery capable end-station 102' would send different sized probe PDUs using the CFM loopback mechanism to determine the maximum MTU size based on correctly returned responses from the remote end-stations 102. The remote end-stations 102 that send correct response would be MTU discovery capable like the sending MTU discovery capable end-station 102. The remote end-station 102 that does not send correct responses is not a MTU discovery capable end-station 102' and as such will not be able to interface with the sending MTU discovery capable end-station 102' to determine the MTU size of their DLL connection.

In this situation, the sending MTU discovery end-station 102' can use any arbitrary mechanism to determine the sizes of different probe PDUs to be sent to the end-stations 102 but one approach is to start with a maximum PDU size that the sending MTU discovery capable end-station 102' might reasonably expect to be successfully returned. For instance, this maximum PDU size could be determined from encapsulation and/or re-encapsulation information and the port/interfaces capabilities, or it may be the result of taking the minimum of the local and remote maximum PDU sizes of port/interface capabilities (if both are known). In either case, the MTU discovery capable end-station 102' sends probe PDUs of varying sizes until a successful return is observed.

If CFM is not ubiquitously supported, then the MTU discovery capable end-station 102' would use some other mechanism to perform the actual MTU size discovery function. For instance, the MTU discovery capable end-station 102' could use a mechanism which relies on the use of a well-defined request/response messaging protocol that has a proprietary protocol identifier, followed by a payload that minimally identifies the messages as either a request or a response, followed by pad data (in the request messages) necessary to create the desired PDU size of the probe request message. The MTU discovery capable end-station 102 would send the proprietary (or well defined) probe request message to the remote end-stations 102 which if they have the MTU discovery capability will respond to it using an equally well defined response message. If no response is received, then the sending MTU discovery capable end-station 102 may determine that the remote end-station 102 is either not reachable, or not MTU discovery capable.

If MTU discovery capability is required, as may be the situation in some applications such as where IS-IS is used and the PDU limitation exists, then the sending MTU discovery capable end-station 102' failure to receive an appropriate response from a remote end-station 102 (using one of the above approaches) may result in the corresponding end-station 102 being reported to a higher layer application, to the network operator or to a management system in order to allow for correction of a potential configuration error, or other adjustments to configuration as needed.

Figure 3:
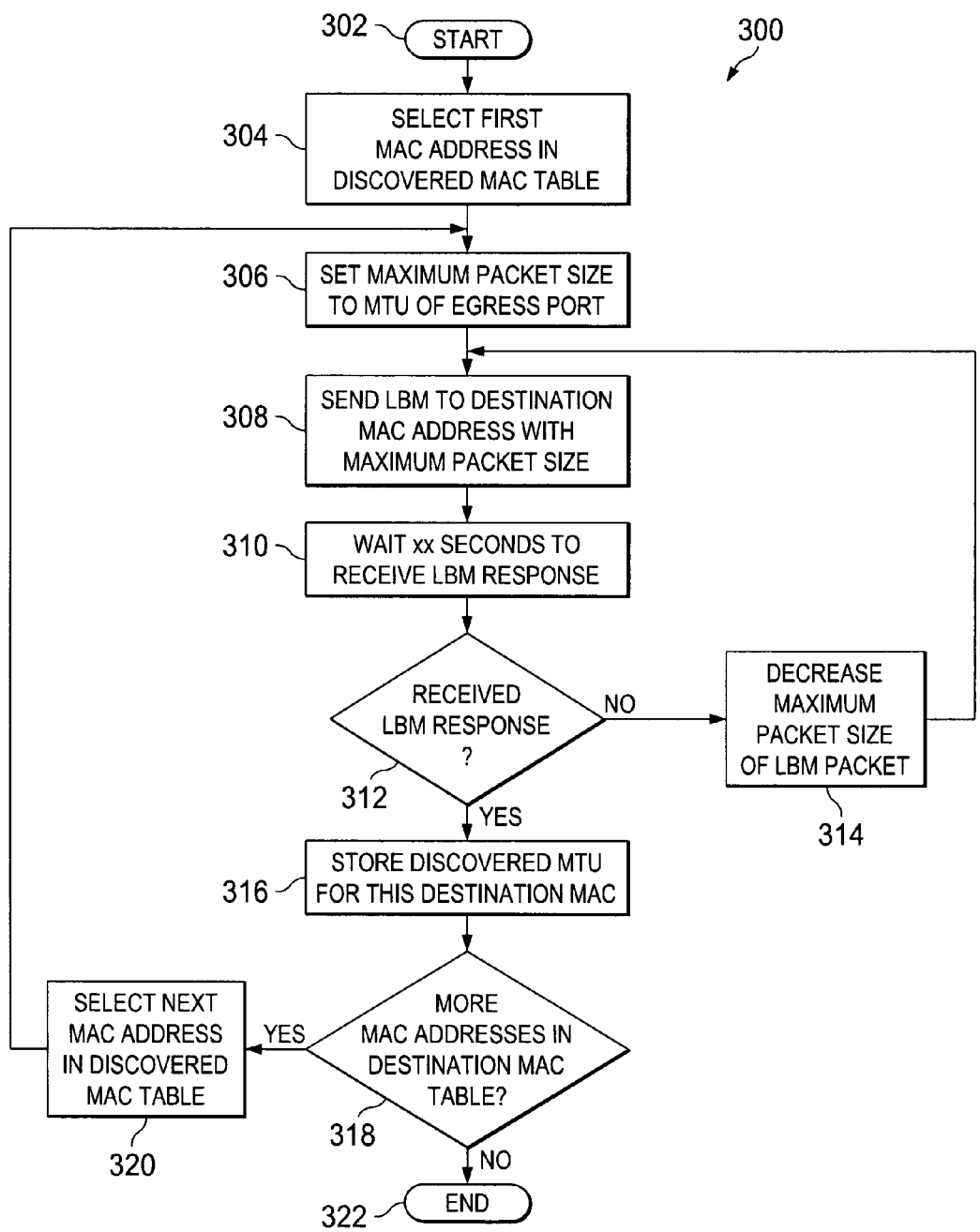
FIG. 3 is a flowchart illustrating an exemplary method that can be implemented by the MTU discovery capable end-station shown in FIGS. 1-2 to perform a MTU size discovery process using a MAC search in accordance with an embodiment of the present invention.

Referring to FIG. 3, there is a flowchart illustrating an exemplary method 300 that can be implemented by the MTU discovery capable end-station 102' to perform the MTU size discovery process using a MAC search in accordance with an embodiment of the present invention. At step 302, the MTU discovery capable end-station 102' can start the MTU size discovery process to determine the MTU sizes for each DLL connection to the other MTU discovery capable end-stations 102' by an external trigger like a timer, by an indication of a topology change, or by whatever external mechanism that allows the MTU discovery capable end-station 102' to discover L2 addresses of end-stations 102 that have been added or removed from the Ethernet network 100. At step 304, the MTU discovery capable end-station 102' selects the first MAC address (first other MTU discovery capable end-station 102') within a discovered MAC table (identifying the other MTU discovery capable end-stations 102'). At step 306, the MTU discovery capable end-station 102' sets the maximum packet size of loopback message (LBM) based on the MTU of it's egress port. At step 308, the MTU discovery capable end-station 102' sends the LBM with the maximum packet size to the destination MAC associated with the other MTU discovery capable end-station 102'. At step 310, the MTU discovery capable end-station 102' waits a predetermined time (xx seconds) to receive a LBM response from the other MTU discovery capable end-station 102'. At step 312, the MTU discovery capable end-station 102' checks if received a LBM response from the other MTU discovery capable end-station 102'. If the result of step 312 is no, then the MTU discovery capable end-station 102' at step 314 decreases the maximum size of the LBM message by for example 1 octet and returns to step 308. If the result of step 312 is yes, then the MTU discovery capable end-station 102' at step 316 stores the discovered MTU size for this destination MAC address which is associated with the other MTU discovery capable end-station 102'. At step 318, the MTU discovery capable end-station 102' checks to determine if there are more MAC addresses in the destination MAC table associated with other MTU discovery capable end-stations 102'. If the result of step 318 is yes, then the MTU discovery capable end-station 102' at step 320 selects the next MAC address (next other MTU discovery capable end-station 102') in the discovered MAC table (identifying the other MTU discovery capable end-stations 102') and then returns to step 306. If the result of step 318 is no, then the MTU discovery capable end-station 102' ends the MTU discovery process at step 322.

Figure 4:
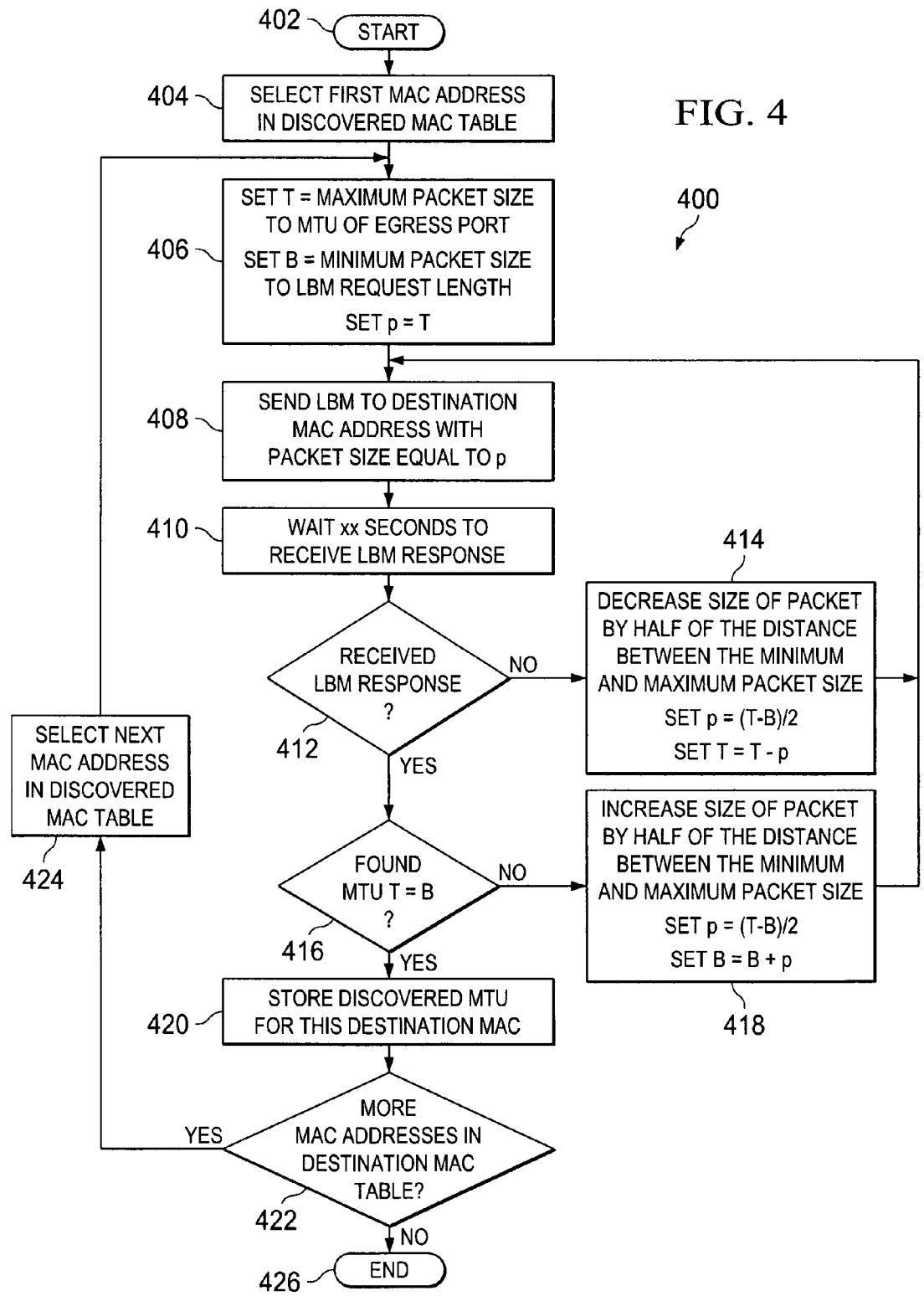
FIG. 4 is a flowchart illustrating an exemplary method that can be implemented by the MTU discovery capable end-station shown in FIGS. 1-2 to perform a MTU size discovery process using a binary search in accordance with an embodiment of the present invention.

Referring to FIG. 4, there is a flowchart illustrating an exemplary method 400 that can be implemented by the MTU discovery capable end-station 102' to perform the MTU size discovery process using a binary search in accordance with an embodiment of the present invention. At step 402, the MTU discovery capable end-station 102' can start the MTU size discovery process to determine the MTU sizes for each DLL connection to the other MTU discovery capable end-stations 102' by an external trigger like a timer, by an indication of a topology change, or by whatever external mechanism that allows the MTU discovery capable end-station 102' to discover L2 addresses of end-stations 102 that have been added or removed from the Ethernet network 100. At step 404, the MTU discovery capable end-station 102' selects the first MAC address (first other MTU discovery capable end-station 102') within a discovered MAC table (identifying the other MTU discovery capable end-stations 102'). At step 406, the MTU discovery capable end-station 102' sets T equal to the maximum packet size of loopback message (LBM) based on the MTU of if's egress port, sets B equal to minimum packet size to the LBM request length, and sets p=T. At step 408, the MTU discovery capable end-station 102' sends the LBM with the packet size equal to p to the destination MAC which is associated with the other MTU discovery capable end-station 102'. At step 410, the MTU discovery capable end-station 102' waits a predetermined time (xx seconds) to receive a LBM response from the other MTU discovery capable end-station 102'. At step 412, the MTU discovery capable end-station 102' checks if received a LBM response from the other MTU discovery capable end-station 102'. If the result of step 412 is no, then the MTU discovery capable end-station 102' at step 414 decreases the size of the LBM message by half of the distance between the minimum and maximum packet sizes by resetting p=(T−B)/2 and resetting T=T−p and returning to step 408. If the result of step 412 is yes, then the MTU discovery capable end-station 102' at step 416 determines if the found MTU in the LBM response is T=B. If the result of step 416 is no, then the MTU discovery capable end-station 102' at step 418 increases the size of the LBM packet by half of the distance between the minimum and maximum packet sizes by resetting p=(T−B)/2 and resetting B=B+p and then returns to step 408. If the result of step 416 is yes, then the MTU discovery capable end-station 102' at step 420 stores the discovered MTU size for this destination MAC address which is associated with the other MTU discovery capable end-station 102'. At step 422, the MTU discovery capable end-station 102' checks to determine if there are more MAC addresses in the destination MAC table associated with other MTU discovery capable end-stations 102'. If the result of step 422 is yes, then the MTU discovery capable end-station 102' at step 424 selects the next MAC address (next other MTU discovery capable end-station 102') in the discovered MAC table (identifying the other MTU discovery capable end-stations 102') and then returns to step 406. If the result of step 422 is no, then the MTU discovery capable end-station 102' ends the MTU discovery process at step 426.

From the foregoing, one skilled in the art can readily appreciate that the MTU discovery capable end-station 102' can use the aforementioned MTU size discovery process to discover the MTU size for each DLL connection to other MTU discovery capable end-stations 102'. This information makes it possible for the MTU discovery capable end-station 102' to forward unicast PDUs at the largest real MTU size for the path connecting to the paired MTU discovery capable end-station 102' rather than having to forward the unicast PDUs to the paired MTU discovery capable end-station 102' at the least MTU size for all of the paths in the Ethernet network 100. Furthermore, there is another possible optimization to the prior art as it relates to the broadcast-based L2 technologies which have to use the least MTU for all paths for broadcasting/multicasting PDUs to target recipients. The possible optimization involves the use of multicast recipient discovery protocols, or other scope-limiting approaches (such as configuration) to reduce the number of paths over which the MTU size minimum is determined for any specific set of PDUs.

Although several embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the present invention that as has been set forth and defined within the following claims.

The invention claimed is:

1. A method implemented by an maximum transmission unit (MTU) capable end-station in a L2 Ethernet network which has a plurality of end-stations and at least a portion of the end-stations are MTU discovery capable end-stations, the method comprising the steps of:
   obtaining L2 addresses of the plurality of end-stations;
   discovering the other MTU discovery capable end-stations;
   discovering a real MTU size for a Data Link Layer (DLL) connection to each of the other MTU discovery capable end-stations, where the MTU discovery capable end-stations are able to perform the obtaining step and the two discovering steps while the end-stations are able to perform the obtaining step, wherein
the step of discovering the real MTU sizes further includes sending Connectivity Fault Management (CFM), loopback messages of varying sizes to each of the other MTU discovery capable end-stations until receive an appropriate response from each of the other MTU discovery capable end-stations to determine the real MTU sizes of the DLL connections to each of the other MTU discovery capable end-stations; and
in response to determining the real MTU sizes of the DLL connections to each of the other MTU discovery capable end-stations, storing the real MTU sizes of the DLL connections to each of the other MTU discovery capable end-stations in conjunction with the L2 addresses corresponding to each of the other MTU discovery capable end-stations.

2. The method of claim 1, wherein the step of obtaining further includes a step of broadcasting explorer frames in the L2 Ethernet network to obtain the L2 addresses of the plurality of end-stations.

3. The method of claim 1, wherein the step of obtaining further includes a step of using a Link Layer Discovery Protocol, LLDP, to obtain the L2 addresses of the plurality of end-stations.

4. The method of claim 1, wherein the step of obtaining further includes a step of using a higher layer address to derive the L2 addresses of the plurality of end-stations.

5. The method of claim 1, wherein the step of discovering the other MTU discovery capable end-stations further includes broadcasting an explore message which is understood by the other MTU discovery capable end-stations and receiving a response containing at least the L2 addresses of the other MTU discovery capable end-stations.

6. The method of claim 1, wherein the two discovery steps are performed at same time using a Connectivity Fault Management, CFM, loopback message.

7. A maximum transmission unit (MTU) capable end-station in a L2 Ethernet network which has a plurality of end-stations and at least a portion of the end-stations are MTU discovery capable end-stations, the MTU discovery capable end-station comprising:
a processor; and
a memory that stores processor-executable instructions where the processor interfaces with the memory and executes the processor-executable instructions to perform the following operations:
obtaining L2 addresses of the plurality of end-stations, discovering the other MTU discovery capable end-stations,
discovering a real MTU size for a Data Link Layer (DLL) connection to each of the other MTU discovery capable end-stations, where the MTU discovery capable end-stations are able to perform the obtaining operation and the two discovering operations while the end-stations are able to perform the obtaining operation, wherein
the processor further executes the processor-executable instructions to perform the second discovery operation by sending Connectivity Fault Management (CFM) loopback messages of varying sizes to each of the other MTU discovery capable end-stations until receive an appropriate response from each of the other MTU discovery capable end-stations to determine the real MTU sizes of the DLL connections to each of the other MTU discovery capable end-stations, and
responsive to determining the real MTU sizes of the DLL connections to each of the other MTU discovery capable end-stations, store the real MTU sizes of the DLL connections to each of the other MTU discovery capable end-stations in conjunction with the L2 addresses corresponding to each of the other MTU discovery capable end-stations.

8. The MTU discovery capable end-station of claim 7, wherein the processor further executes the processor-executable instructions to perform the obtaining operation by:
broadcasting explorer frames in the L2 Ethernet network to obtain the L2 addresses of the plurality of end-stations.

9. The MTU discovery capable end-station of claim 7, wherein the processor further executes the processor-executable instructions to perform the obtaining operation by:
using a Link Layer Discovery Protocol, LLDP, to obtain the L2 addresses of the plurality of end-stations.

10. The MTU discovery capable end-station of claim 7, wherein the processor further executes the processor-executable instructions to perform the obtaining operation by:
using a higher layer address to derive the L2 addresses of the plurality of end-stations.

11. The MTU discovery capable end-station of claim 7, wherein the processor further executes the processor-executable instructions to perform the first discovery operation by:
broadcasting an explore message that is understood by the other MTU discovery capable end-stations and receiving a response containing at least the L2 addresses of the other MTU discovery capable end-stations.

12. The MTU discovery capable end-station of claim 7, wherein the processor further executes the processor-executable instructions to perform the two discovery operations are the same time by:
using a Connectivity Fault Management, CFM, loopback message.

13. A L2 Ethernet network, comprising:
a plurality of end-stations at least a portion of which are MTU discovery capable end-stations, were each MTU discovery capable end-station includes:
a processor; and
a memory that stores processor-executable instructions where the processor interfaces with the memory and executes the processor-executable instructions to perform the following operations:
obtaining L2 addresses of the plurality of end-stations, discovering the other MTU discovery capable end-stations, and
discovering a MTU size for a Data Link Layer (DLL) connection to each of the other MTU discovery capable end-stations, where the MTU discovery capable end-stations are able to perform the obtaining operation and the two discovering operations while the end-stations are able to perform the obtaining operation, wherein
the processor further executes the processor-executable instructions to perform the second discovery operation by sending Connectivity Fault Management (CFM) loopback messages of varying sizes to each of the other MTU discovery capable end-stations until receive an appropriate response from each of the other MTU discovery capable end-stations to determine the MTU sizes of the DLL connections to each of the other MTU discovery capable end-stations, and
responsive to determining the real MTU sizes of the DLL connections to each of the other MTU discovery capable end-stations, store the real MTU sizes of the DLL connections to each of the other MTU discovery capable end-stations in conjunction with the L2 address corresponding to each of the other MTU discovery capable end-stations.

* * * * *

UNITED STATES PATENT AND TRADEMARK OFFICE
CERTIFICATE OF CORRECTION

| | | |
|---|---|---|
| PATENT NO. | : 8,811,190 B2 | Page 1 of 1 |
| APPLICATION NO. | : 13/202802 | |
| DATED | : August 19, 2014 | |
| INVENTOR(S) | : Gray et al. | |

It is certified that error appears in the above-identified patent and that said Letters Patent is hereby corrected as shown below:

In the specification

In Column 2, Lines 42-43, delete "a PCU was dropped as "big."" and insert -- a PDU was dropped as "too big." --, therefor.

In Column 5, Line 55, delete "to to probe" and insert -- to probe --, therefor.

In Column 6, Line 1, delete "FIG.1" and insert -- FIG.1, --, therefor.

In the claims

In Column 10, Line 57, in Claim 1, delete "by an" and insert -- by a --, therefor.

In Column 12, Line 35, in Claim 13, delete "were" and insert -- where --, therefor.

In Column 12, Line 44, in Claim 13, delete "and".

Signed and Sealed this
Thirteenth Day of October, 2015

Michelle K. Lee
*Director of the United States Patent and Trademark Office*